Nov. 19, 1957     C. CHRISTODOLU     2,813,408
COUPLING FOR FLEXIBLE DRIVE SEWER CLEANER
Filed Feb. 27, 1957
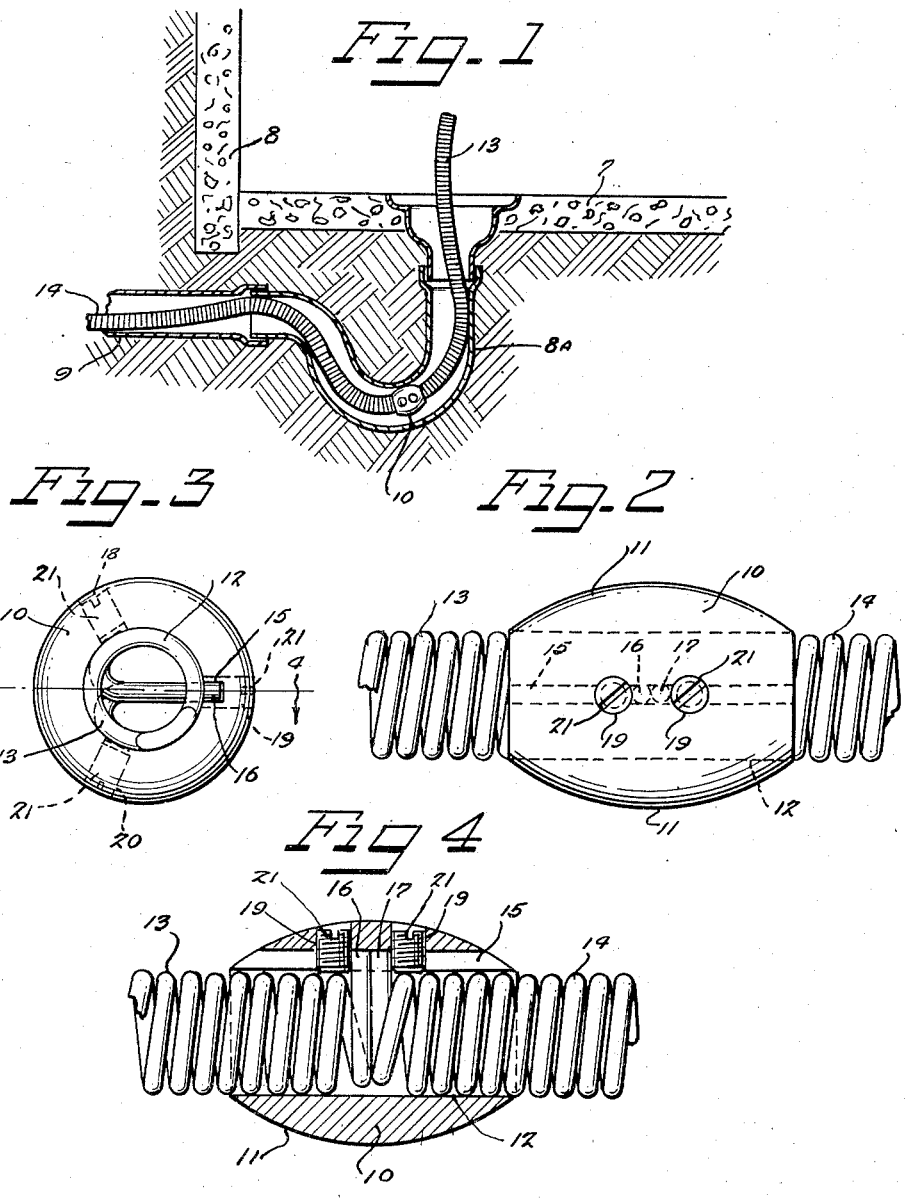
Inventor
CONSTANTINOS CHRISTODOLU
By Edward M. Apple
Atty

United States Patent Office 2,813,408
Patented Nov. 19, 1957

2,813,408

COUPLING FOR FLEXIBLE DRIVE SEWER CLEANER

Constantinos Christodolu, Detroit, Mich.

Application February 27, 1957, Serial No. 642,853

6 Claims. (Cl. 64—6)

This invention relates to couplings, and has particular reference to a coupling for use with a flexible, snake, or coil type cable, such as used by plumbers for cleaning roots, refuse and the like from domestic sewers and drain pipes, and this invention may be considered a continuation in part of the invention disclosed in my co-pending application, Serial Number 494,421, filed March 15, 1955.

An object of the invention is to provide a coupling of the character indicated, which is proportioned, constructed and arranged, so that it may easily negotiate the comparatively small confines of a four inch sewer trap, and the narrow opening in the chuck of a driving machine, when it is used with standard lengths of flexible cable.

Another object of the invention is to provide a coupling, whereby conventional lengths of one inch diameter, snake or coil type flexible cable, may be joined together, so that working cables up to two hundred feet in length may be driven by a single machine.

Another object of the invention is to provide a coupling, for joining together the ends of standard sections of flexible cable of the characer indicated, so that the resulting extremely long length of cable is reinforced and strengthened at spaced intervals, so that any tendency of the long cable to whip while in use is minimized.

Another object of the invention is to provide a coupling for joining together the ends of standard sections of flexible cable, at the leading end of which is mounted a cutting head, such as disclosed in Patent Number 2,765,149, issued to me October 2, 1956, which cutting head has many structural peculiarities, and performs unusual results, all of which are improved when the head is used in conjunction with sections of flexible cable, connected together by a plurality of the couplings as herein disclosed.

The foregoing and other objects and advantages of the invention will become more apparent as the description proceeds, reference being made from time to time to the accompanying drawing, forming part of the within disclosure, in which drawing:

Fig. 1 is a vertical section taken through a portion of a building, in which is positioned a conventional sewer trap, through which is extended a flexible cable, the sections of which are joined by the coupling embodying the invention.

Fig. 2 is an enlarged side elevational view of the coupling shown in Fig. 1, with sections of the flexible cable connected thereby.

Fig. 3 is an end view of the device shown in Fig. 2.

Fig. 4 is a section taken substantially on the line 4—4 of Fig. 3.

Referring now more particularly to the drawing, it will be understood that the reference character 7 indicates the floor, and the reference character 8A indicates the wall of a house, which is equipped with a conventional sewer trap 8, the inside diameter of which is generally not greater than four inches. The sewer trap 8A is connected to the sewer line 9, which often becomes clogged with tree roots, refuse and the like, so that it often becomes necessary to clean out such lines. Oftentimes it is necessary to tear up the floor, or connect into the sewer line 9 on the outside of the house. This means excavating to the depth of the sewer line, and otherwise disturbing the sewer line in order to make entrance into the same.

It is one of the objects of this invention to obviate these difficulties, and to provide a mechanism which can be fed into the sewer line 9 through the trap 8, without in any way disturbing the sewer line or the trap.

In order to enable remote sections of the sewer line 9 to be reached, sometimes it is necessary to use flexible cables as long as two hundred feet. A single length of cable of such proportions, would be difficult, if not impossible, to transport and handle. I, therefore, propose to connect together shorter and conventional lengths of these cables, so that the far reaches of the sewer line 9 may be cleaned. To connect together the comparatively short lengths of flexible cable, I propose a coupling such as herein disclosed. This coupling is designed and shaped, so that it will readily negotiate the sharp curves of the sewer trap 8 and will reinforce the ends of the joined sections of cable, and will greatly facilitate the use of the cutter head hereinabove referred to, which is fully disclosed in my issued patent cited above.

The coupling 10 consists of a thick wall tubular member, whose greatest diameter is slightly less than its length, and the outer longitudinal surfaces 11 of which, are in the form of long curves to facilitate the passage of the coupling through the tortuous passageways of the trap 8, and through the narrow opening in the chuck of the driving machine (not shown). With this coupling short sections of cable may be joined together, and the joined sections may be fed through the driving machine chuck, without the necessity of interrupting the operation of the machine to make such connections, as is the case in driving machines now known to the public.

The central bore 12 of the tubular member is preferably of such size that it may receive the ends of the one inch diameter flexible cable sections 13 and 14, so that the ends may be joined together by the coupling 10 to form a longer length of cable. The cable sections 13 and 14 are usually made in maximum lengths of approximately thirty-five feet, and in many cases it is necessary to join together a multiplicity of these sections to form a cable as long as two hundred feet.

The tubular member 10 is provided with a key-way 15, which is adapted to receive the radially directed driving nubs 16 and 17, formed at each end of the cable sections 13 and 14. It will be noted that the cable ends, and the driving nubs 16 and 17, are in abutting relation inside of the coupling. This prevents the inward movement of the cable sections with respect to the coupling. The tubular member 11 is provided with a plurality of threaded radial bores 18, 19 and 20, which are preferably spaced approximately one hundred and twenty degrees from each other, in which bores are threaded the set screws 21. The set screws 21, in the bores 19, communicate with the interior of the key-way 15 and serve as stops, or limit means, to prevent the outward displacement of the cable sections 13 and 14. The abutting ends of the cable sections 13 and 14, and the nubs 16 and 17, prevent the inward displacement of the cable sections as previously indicated.

The set screws in the bores 18 and 20 are arranged to impinge upon the outer surfaces of the cable sections 13 and 14, and further help to secure the coupling and the cable sections against displacement with respect to each other.

In practice, it is often desirable to couple together a number of cable sections, so that an overall length of cable of upwards of two hundred feet in length may be utilized. Couplings as hereinabove described, positioned at approximately thirty-five foot intervals, reinforce the cable, and prevent it from whipping, when it is being rotated on the interior of a drain pipe or the like. At the same time the couplings are of such overall size and shape, that they can readily negotiate the sharp turns in a four inch sewer trap and the like. They are also of such size and shape that they may readily pass through the openings in the chuck of a conventional driving machine. The curved surfaces 11 of the couplings further facilitate the movement of the cable through any sharp bends, during the operation of extending the cable into the drain pipe and while retracting the cable from the same. With couplings such as hereinabove described I have been successful in extending a cutting head at the end of a flexible cable much farther into a drain pipe than has heretofore been possible, all of which is done without in any way disturbing the construction of the drain pipe, the trap, or any part of the building, or the ground surrounding the same.

It is believed that the operation of the device is obvious from the foregoing description.

Having described my invention what I claim and desire to secure by Letters Patent is:

1. In combination with two lengths of coil type, flexible cable, each having a radially directed driving nub at the end, a coupling consisting of a thick wall tubular element, the greatest diameter of which is less than its length, and having its outside longitudinal surfaces in the form of continuous curves, a key-way extending through said coupling and arranged to receive, in abutting relation, the driving nubs of said lengths of cable, a plurality of spaced threaded radial bores in said member, at least two of which are in spaced relation to each other and communicate with said key-way, and set screws in said last named bores, in contact with said driving nubs.

2. The structure of claim 1, in which said bores are arranged in two groups, the bores of each group being spaced approximately one hundred and twenty degrees apart radially about the outer periphery of said tubular member.

3. The structure of claim 1, in which the set screws in the bores which communicate with said key-way are positioned on the outside of said driving nubs, whereby to prevent the outward displacement of said driving nubs, and the other set screws are spaced radially from said first set screws, whereby to impinge upon the outer surfaces of said flexible cable.

4. A coupling, for two sections of a coil type, flexible cable, for use in a sewer, or drain pipe, said coupling comprising a body, the diameter of which is less than its length, and having its longitudinal surfaces in the form of continuous curves, a central bore in said body for receiving in abutting relation the ends of said cable sections, a key-way in said body for receiving, in abutting relation, radial driving nubs formed on the ends of said cable sections, at least two radial bores in said body in communication with said key-way and in spaced longitudinal relation with respect to said body, and set screws in said bores, each arranged to contact one of said driving nubs, whereby to prevent the outward displacement of said cable sections with respect to said body.

5. The structure of claim 4, in which said set screws are spaced from each other in said key-way a distance approximately twice the diameter of one of said driving nubs.

6. The structure of claim 4, including two sets of additional radial bores in said body, and set screws in said bores, said last named set screws being positioned to impinge on the sides of said cable sections.

References Cited in the file of this patent
UNITED STATES PATENTS

| | | |
|---|---|---|
| 1,913,589 | Foulds | June 13, 1933 |
| 2,765,149 | Christodolu | Oct. 2, 1956 |